United States Patent [19]

Kieronski

[11] Patent Number: 4,470,913

[45] Date of Patent: Sep. 11, 1984

[54] METHOD AND APPARATUS FOR FLUID ASSISTED FILTER DOFFING

[75] Inventor: John P. Kieronski, Charlotte, N.C.

[73] Assignee: Terrell Machine Company, Charlotte, N.C.

[21] Appl. No.: 500,014

[22] Filed: Jun. 7, 1983

Related U.S. Application Data

[63] Continuation of Ser. No. 300,870, Sep. 10, 1981, abandoned.

[51] Int. Cl.³ ............................................. B01D 33/02
[52] U.S. Cl. ........................................ 210/791; 55/96; 55/290; 210/784; 210/386; 210/393; 210/402
[58] Field of Search .................. 55/96, 290, 291, 295, 55/351; 210/402, 404, 408, 410, 411, 779, 780, 783, 784, 797, 791, 386, 393, 406, 396; 162/275, 276

[56] References Cited

U.S. PATENT DOCUMENTS

| | | | |
|---|---|---|---|
| 2,839,194 | 6/1958 | Lopker et al. | 210/402 X |
| 4,115,271 | 9/1978 | Holt | 210/402 X |
| 4,226,715 | 10/1980 | Niederer et al. | 210/783 |
| 4,360,369 | 11/1982 | Niederer | 55/290 X |

Primary Examiner—Richard V. Fisher
Assistant Examiner—W. Gary Jones
Attorney, Agent, or Firm—W. Thad Adams, III

[57] ABSTRACT

A fluid assisted doffer (30) is disclosed in combination with a fluid filter (10). The fluid filter (10) includes a rotatably mounted drum (23) covered with a filter screen (25). Fluid is filtered through screen (25) from the upstream to the downstream side to form an overlying porous layer of particulate matter. The downstream side of the drum (23) includes filter chambers (A) and (B) being sealed against direct fluid flow. The fluid assisted doffer comprises a doffing chamber (45) positioned on the downstream side of screen (25) at the position where the overlying porous layer of particulate matter is to be removed from the screen (25) and communicating through the screen (25) with the upstream side thereof. The doffing chamber (45) is sealed against direct fluid communication with filter chambers (A) and (B) on the downstream side of the screen (25). Fluid is diverted from the upstream side of the screen (25) therethrough, onto the doffing chamber (45) and out of the doffing chamber (45) through the screen (25) and against the underside of the overlying porous layer of particulate matter. The fluid thereby mechanically assists the porous layer of particulate matter is being removed from the screen (25).

8 Claims, 3 Drawing Figures

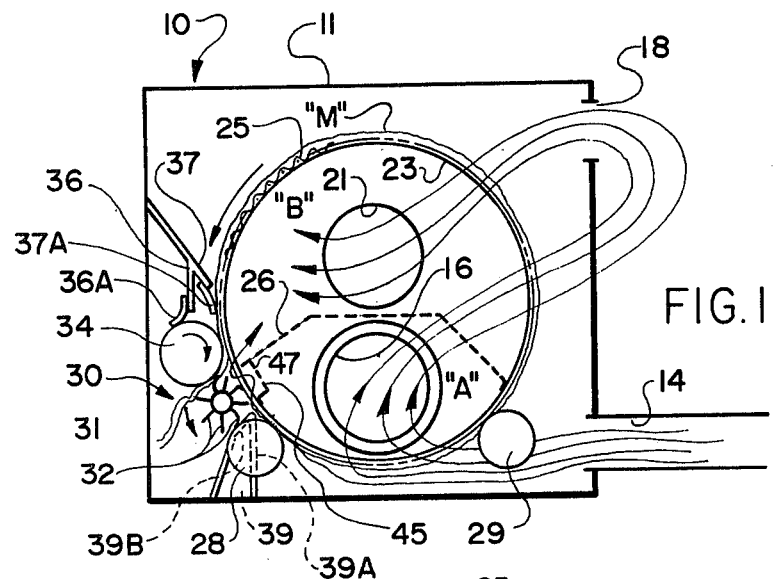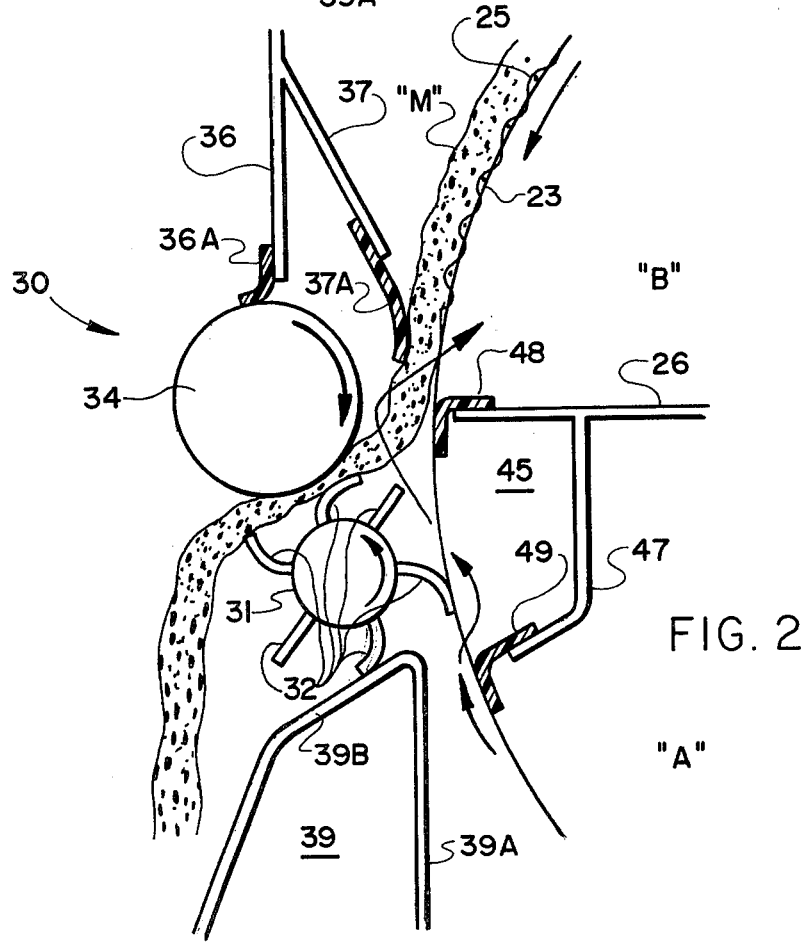

METHOD AND APPARATUS FOR FLUID ASSISTED FILTER DOFFING

This application is a continuation of application Ser. No. 300,870, filed 9/10/81 now abandoned.

TECHNICAL FIELD AND BACKGROUND OF THE INVENTION

This invention relates to a method and apparatus for assisting by fluid flow the doffing of an overlying porous layer of particulate matter (referred to as a "mat") from the surface of a filter medium, such as a fluid permeable filter screen. The method and apparatus according to this invention has application in many different types of condensers and fluid filters. The particular disclosure set out in this application relates, for illustrative purposes, to the fluid assisted doffing of a mat comprised of various types of particulate matter, such as fibers, dust and dirt commonly found in the textile processing industry and which for reasons of safety and health must be removed from the environment. This is usually accomplished by filtering the air within which the dirt and fibers are entrained through a filtering apparatus.

One of the ways this is accomplished is by filtering the particulate laden air through a filter medium such as a screen. Filtration takes place not only by the passage of the air through the filter medium, but after a mat of particulate matter builds up on the filter medium, the mat itself acts as an additional filter medium of enhanced filtering capacity. Prior inventions by the present assignee have dramatically increased the efficiency of such filters by optimizing the size of the openings in the filter medium and then using the filter medium essentially as a filter support on which an overlying porous mat having enhanced filtering capacity is built.

However, the mat must be removed periodically from the underlying filter support so that the thickness of the mat does not substantially exceed a point where the filtration efficiency ceases to improve. This is also necessary because the increasing thickness of the mat progressively restricts the flow of air through the filter, causing filtration capacity at any given energy level to decrease. When the mat is removed from only a portion of the filter screen, the pressure drop through this area decreases relative to the portion of the filter screen still carrying the mat. As a result, most of the air entering the filter will move toward the area of least resistance and pass through the clean filter medium. This results in a greatly reduced filtration efficiency through this area until the mat again begins to accumulate on the underlying filter medium.

This known deficiency in prior art filtering processes has been adapted and turned into a useful phenomenon in the recent U.S. Pat. No. 4,226,715 issued to the present assignee, Terrell Machine Company. As disclosed in the above-referenced patent, particulate laden air is used to build an overlying mat of enhanced filtering capacity over a filter screen which acts primarily as a filter support for the mat. Because of the structure of the filter, air is not permitted to exit the filter enclosure until it has passed through this overlying mat. Therefore, periodic decrease in filtered air quality as a result of some air passing through the clean filter screen has been eliminated.

However, in order for a mat to be quickly and efficiently built up over the doffed portion of the filter screen, the screen must be substantially cleaned each time it is doffed. If this is not done, areas of the filter screen may remain blocked by contaminants which will prevent air from passing through that section of the screen and will therefore prevent the proper buildup of the mat. This occurrence increases the amount of energy required and decreases the filtration capacity of the filter. Should the blockage become dislodged at some later stage in the filtration process, a substantial decrease in filtering efficiency would occur as the air is passed through this bare area instead of through the overlying mat, as is desired.

Certain materials are inherently easy to doff under optimum conditions from an underlying filter screen. For example, textile fibers accompanied by relatively low percentages of dust and dirt form an overlying mat which has a high degree of internal cohesion. Thus a conventional doffing roll having radially extending elastomeric vanes can easily remove the entire mat leaving a completely clean filter screen. However, in conditions of high humidity and/or with a mat having a realtively large percentage of dust and dirt, the action of doffing the mat can produce a very thin layer of mud-like substance which coats the filter screen and completely blocks large areas of the screen against the passage of air. The presence of fibers in this "mud" provides further strength, causing it to cling tenaciously to the filter screen. This problem is even more serious in environments where the particulate matter being filtered from the air is comprised principally of dust, dirt, fly ash, flour or the like.

Experimentation with this problem has resulted in the development of a way to prevent blockage of the filter screen. The mat is pushed away from the screen by passing a stream of air through the screen and against the underside of the mat. This has been accomplished while completely preventing the passage of any contaminated air into the environment.

SUMMARY OF THE INVENTION

Therefore, it is an object of the invention to provide a method and apparatus for assisting by fluid flow the removal of an overlying porous mat of particulate matter from an underlying filter medium.

It is another object of the present invention to provide a method and apparatus for preventing blockage of an underlying filter screen as an overlying mat is periodically doffed therefrom.

It is another object of the present invention to provide a method and apparatus which assists by fluid flow the removal of a mat from an underlying filter screen without adding contaminants to filtered air which is then reintroduced into the surrounding environment.

It is yet another object of the present invention to provide a method and apparatus which permits the fluid assisted doffing of a mat from an underlying filter screen without the use of additional pumps or blowers.

These and other objects and advantages of the present invention are achieved in a preferred embodiment of the method and apparatus below by providing fluid assisted doffing means in combination with a fluid filter of the type wherein a particulate laden fluid stream is filtered through a filter medium from its upstream side to its downstream side to form an overlying porous mat of particulate matter on the upstream side of the filter medium. The fluid assisted doffing means preferably comprises means for diverting fluid from the upstream side of the filter medium to beneath the overlying porous mat at the point where the mat is to be removed, and urging the fluid against the underside of the mat whereby the fluid mechanically assists in the removal of the mat from the filter medium.

In accordance with the preferred embodiment of the invention disclosed herein, the filter comprises a rotatably mounted cylindrical drum. The filter medium covering the circumferential periphery of the drum comprises a screen. Means are also provided for directing the mat away from the filter screen for disposal.

BRIEF DESCRIPTION OF THE DRAWINGS

Some of the objects of the invention have been set forth above. Other objects and advantages of the invention will appear as the description of the invention proceeds, when taken in conjunction with the following drawings, in which:

FIG. 1 is a schematic cross-sectional view of one preferred embodiment of the apparatus according to this invention on a cylindrical drum-type fluid filter;

FIG. 2 is an enlarged cross-sectional view of a preferred embodiment of the apparatus according to the present invention.

DESCRIPTION OF THE PREFERRED EMBODIMENT

Figure 3:
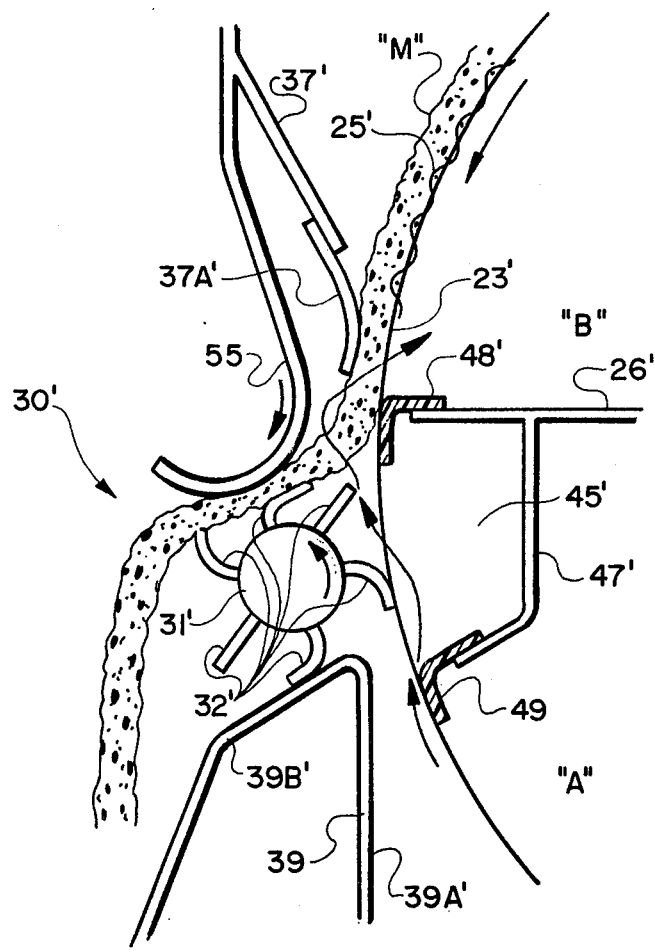
FIG. 3 is an enlarged cross-sectional view of another preferred embodiment of the apparatus according to the present invention.

Referring now specifically to the drawings, FIG. 1 shows a preferred embodiment of the fluid assisted doffing means according to the present invention in place on a cylindrical drum-type filter.

The filter, designated at broad reference numeral 10, includes a housing 11 enclosing the filtration components and including four side walls and two end walls. Inlet 14 admits air into the housing 11. Two air outlets 16 and 21 are provided in opposing end walls of the housing 11. Positioned within housing 11 is a cylindrical drum 23 which is preferably formed of expanded metal. Drum 23 is covered around its entire circumferential periphery by a filter support, comprising a filter screen 25 and is mounted for rotation by means of rollers 28 and 29. Rollers 28 and 29 have a relatively short axial length and are mounted on opposing ends of housing 11 so that the opposing, extreme edge portions of cylindrical drum 23 ride thereon. Drum 23 is preferably driven by a sprocket gear (now shown) which mateingly engages with a chain extending around one circumferential edge of drum 23 (now shown). Positioned within the interior of drum 23 is an imperforate metal shroud 26 which defines an enclosed filter chamber "A" which serves as a filtermaking zone and which is physically separate from the remainder of the interior of the drum 23, which defines a filter chamber "B" and serves as the filtration zone of the filter.

Still referring to FIG. 1, air enters the filter housing 11 through air inlet 14. Air passes through the filter screen 25 from the upstream to the downstream side as is illustrated by arrows. In so doing, an overlying porous layer of particulate matter begins building up on the filter screen 25 to form a mat "M". The air then passes through outlet 16 and is conveyed by a conduit (not shown) to inlet 18 and into the enclosure 11 where it passes through mat "M", the underlying filter screen 25 and the drum 23. This constitutes the primary filtering operation. Air then exits the filter housing 11 through outlet 21 in a highly filtered state. A blower (not shown) downstream of outlet 21 pulls air through the filter 10.

As mentioned above, filter screen 25 must be cleaned in order to expose a clean filter surface on which mat "M" again begins to form. The process of removing mat "M" from filter screen 25 may be continuous with the drum 23 rotating at a pre-determined slow speed, or the mat "M" may be removed periodically by sensing the pressure differential on upstream and downstream sides of the drum 23 and causing the drum to rotate when a given pressure differential is reached.

The air assisted doffing means according to the present invention is shown in FIG. 1 at broad reference numeral 30. A doffing roller 31 is rotatably mounted closely adjacent the periphery of drum 23. A plurality of flexible elastomeric vanes 32 are mounted on and extend radially outwardly from doffing roller 31.

A sealing roller 34 is positioned for rotation above doffing roller 31. Baffle plates 36 and 37 are positioned above sealing roller 34 and have flexible elastomeric seals 36a and 37a, respectively, attached to their free ends. Seal 36a engages the surface of sealing roller 34 and seal 37a engages the mat "M" as it moves with the drum 23 toward doffing roller 31. Seal 37a also keeps mat "M" from detaching itself from screen 25 prior to reaching the doffing chamber, as described below.

A chamber baffle 39 is positioned below doffing roller 31. The inwardly facing wall 39a of chamber baffle 39 extends at a tangent to the surface of drum 23 and defines therebetween a narrowed throat which creates a venturi effect as air on the upstream side of drum 23 moves from inlet 14 through this area. An upwardly facing wall 39b of chamber baffle 39 extends radially inwardly towards drum 23 and forms a surface on which successive vanes 32 sealingly engage as doffing roller 31 rotates. As is shown in FIG. 2, vanes 32 of doffing roller 31 are of such length that, as they rotate, they successively sealingly engage against wall 39b, the outer surface of filter screen 25 on drum 23 and finally against mat "M" which is removed from filter screen 25 and is trapped between the rotating sealing roller 34 and rotating doffing roller 31. Vanes 32 are spaced sufficiently close together on doffing roller 31 so that successive vanes 32 engage the surfaces to be sealed before the preceeding vane 32 disengages from the same surface.

Still referring to FIG. 2, a doffing chamber 45 is shown on the downstream side of drum 23 in substantial radial alignment with doffing roller 31. Doffing chamber 45 is defined by one of the peripheral edges of shroud 26 and is angled to extend downwardly and radially outwardly into close proximity with drum 23. An elastomeric seal 48 is secured to the outwardly extending peripheral edge of shroud 26 and sealingly engages against the downstream side of drum 23. Likewise, an elastomeric seal 49 is secured to plate 47 and also sealingly engages against the downstream side of drum 23. The space enclosed by shroud 26 between plate 47 and drum 23, defines the doffing chamber 45. As is shown in FIG. 2, seals 48 and 49 prevent direct fluid flow between filter chamber "A" and filter chamber "B". All of the above-described elements extend substantially the entire length of the filter screen 25 which covers drum 23.

The vacuum pressure upstream of filter chamber "A" is substantially less than the vacuum pressure in filter chamber "B". This pressure drop is caused by the presence of mat "M" on screen 23 which restricts the free flow of air therethrough. Therefore, a pressure differential is created on opposite sides of the area defined by doffing chamber 45. Because at least one of the vanes 32 is always in sealing engagement with filter screen 25 across the opening of the doffing chamber 45, air upstream of filter chamber "A" is forced to bypass the vane 32 by passing through the filter screen 25 and into the doffing chamber 45, and around the vane 32. The air in doffing chamber 45 must exit doffing chamber 45 through the filter screen 25 on the other side of the vane 32. Because of the relatively high vacuum pressure in filter chamber "B", the air is urged in that direction. In order to reach filter chamber "B", the air must pass through mat "M" immediately above doffing roll 31. The movement of this air in this manner mechanically urges the mat away from filter screen 25. In so doing, the air passes through each of the openings in screen 25, clearing them of dirt, dust and other debris. Seals 36a and 37a form a block preventing movement of the air around the circumference of the drum 23. For this reason, the air in the space defined between baffle plates 36 and 37 must pass back through mat "M" from the upstream to the downstream side thereof above the point where it has been physically removed from screen 25. In so doing, the air is filtered in precisely the same manner as any other air which passes through mat "M" and into filter chamber "B". Thus, the same air which has been used to remove mat "M" is thereafter filtered with the same degree of efficiency as air which is not used to assist in removing mat "M". The doffing roller 31 serves the primary purpose of directing the removed mat "M" away from the surface of drum 23. The impingement of mat "M" between rotating doffing roller 31 and rotating sealing roller 34 causes the mat to be deposited in a suitable place for disposal.

In an alternative embodiment of the invention, sealing roller 34 is eliminated. In its place an elongate curved sealing plate 55 is positioned in close proximity to doffing roller 31. Sealing plate 55 preferably has a smooth, polished outer surface so that mat "M" slides easily along the curved surface as it is directed away from screen 25 by the action of the air on its underside. The remaining elements in FIG. 3 correspond to those shown in FIG. 2 and are therefore indicated by prime reference numerals corresponding to those shown in FIG. 2.

The principle of the fluid assisted doffing means 30 as disclosed above lends itself to application in a variety of constructions and uses. For example, planar filter screens and rotating filter "disks" can likewise be periodically cleaned of an overlying mat of particulate matter by using the concepts according to the present invention. The amount and velocity of air impacting the underside of the mat can be easily regulated without interfering with the overall operation of the filter.

An apparatus and method for the fluid assisted doffing of mats from filter surfaces is described above. Various details of the invention may be changed without departing from its scope. Furthermore, the foregoing description of preferred embodiments of the apparatus and method according to the present invention is provided for the purpose of illustration only and not for the purpose of limitation—the invention being defined by the claims.

I claim:

1. A method for removing an overlying porous layer of particulate matter from a filter medium together with any particulate matter remaining within the structure of the filter medium, which method comprises the steps of:
    (a) directing fluid from the downstream side of said filter medium through said filter medium to the upstream side thereof to remove any particulate matter therefrom;
    (b) directing said fluid against the overlying porous layer of particulate matter, whereby said overlying porous layer of particulate matter is removed from said filter medium; and,
    (c) passing said fluid through said overlying porous layer of particulate matter from the downstream side to the upstream side thereof and then back through said overlying porous layer of particulate matter from the upstream side to the downstream side thereof in advance of the position where it is remove from said filter medium, thereby filtering the fluid.

2. A method according to claim 1 and including the further step of directing said overlying porous layer of particulate matter away from said filter medium after said overlying porous layer is removed therefrom.

3. A method according to claim 1, wherein the fluid which removes said overlying porous layer of particulate matter from said filter medium is first diverted to the downstream side of said filter medium from the upstream side thereof.

4. In a fluid filter of the type wherein a particulate laden fluid stream is filtered through a filter medium from the upstream to the downstream side thereof to form an overlying porous layer of particulate matter on the upstream side of the medium, the combination therewith of fluid assisted doffing means for removing the overlying porous layer of particulate matter from said filter medium, and cleaning any remaining particulate matter from within the structure of the filter medium, said doffing means comprising:
    (a) means for diverting fluid from the upstream side of the filter medium to beneath said overlying porous layer of particulate matter and said filter medium at the point where the porous layer of particulate matter is to be removed therefrom;
    (b) means for urging said fluid through said filter medium against the underside of said porous layer of particulate matter,
whereby said fluid mechanically assists said porous layer of particulate matter in being removed from the filter medium and cleans and removes particulate matter from within the structure of the filter medium; and,
    (c) means for passing fluid back through said overlying porous layer of particulate matter from the upstream side to the downstream side thereof in advance of the doffing means, thereby filtering the fluid.

5. The combination according to claim 4, wherein said doffing means includes means for directing the porous layer away from said filter medium for disposal.

6. The combination according to claim 5, wherein said filter includes a rotatably mounted cylindrical drum and wherein said filter medium covers the circumferential periphery of said drum and comprises a screen.

7. The combination according to claim 6, wherein said means for directing the porous layer away from said filter includes a rotatably mounted roller extending along the axial length of said drum closely adjacent the outer peripheral surface thereof, and means positioned on the surface of said roller for engaging and directing said porous layer of particulate matter away from said drum.

8. In a fluid filter of the type wherein a particulate laden fluid stream is filtered through a screen from the upstream to the downstream side thereof to form an overlying porous layer of particulate matter on the upstream side of the screen, and wherein the downstream side of the filter includes first and second filter chambers having a pressure differential therebetween and being sealed against direct fluid flow therebetween, the combination therewith of fluid assisted doffing means for removing the overlying porous layer of particulate matter from said screen, and cleaning and removing particulate matter from within the structure of the screen, said doffing means comprising:

(a) a doffing chamber positioned on the downstream side of said screen at the position where the overlying porous layer of particulate matter is to be removed from said screen and communicating through said screen with the upstream side thereof;

(b) means for sealing said doffing chamber against direct fluid communication with said first and second filter chambers on the downstream side of said screen;

(c) means for diverting fluid from the upstream side of said screen through said screen into said doffing chamber thereby cleaning and removing any remaining particulate matter from within the structure of the filter and out of said chamber through said screen against the underside of said overlying porous layer of particulate matter whereby said fluid mechanically assists said porous layer of particulate matter in being removed from the screen and cleaning the screen of any remaining particulate matter; and, (d) means for passing fluid back through said overlying porous layer of particulate matter from the upstream side to the downstream side thereof in advance of the doffing means, thereby filtering the fluid.

* * * * *